United States Patent
Takahashi et al.

(10) Patent No.: US 8,514,679 B2
(45) Date of Patent: Aug. 20, 2013

(54) OPTICAL INFORMATION RECORD/PLAYBACK DEVICE

(75) Inventors: Yuichi Takahashi, Nara (JP); Kazuo Momoo, Osaka (JP)

(73) Assignee: Panasonic Corporation, Kadoma-shi (JP)

( * ) Notice: Subject to any disclaimer, the term of this patent is extended or adjusted under 35 U.S.C. 154(b) by 68 days.

(21) Appl. No.: 13/277,218

(22) Filed: Oct. 20, 2011

(65) Prior Publication Data
US 2012/0155237 A1 Jun. 21, 2012

(30) Foreign Application Priority Data
Dec. 15, 2010 (JP) .................................. 2010-279594

(51) Int. Cl.
*G11B 7/00* (2006.01)
(52) U.S. Cl.
USPC .................... 369/47.51; 369/53.26; 369/116; 372/29.021
(58) Field of Classification Search
USPC ............... 369/47.5, 47.51, 47.52, 53.26, 116; 372/29.021
See application file for complete search history.

(56) References Cited

U.S. PATENT DOCUMENTS

| | | | |
|---|---|---|---|
| 5,521,892 A * | 5/1996 | Suzuki | 369/44.36 |
| 6,317,405 B1 * | 11/2001 | Arai | 369/116 |
| 7,304,936 B2 * | 12/2007 | Yang et al. | 369/116 |
| 8,270,270 B2 * | 9/2012 | Liu et al. | 369/47.5 |
| 2002/0114244 A1 * | 8/2002 | Kelly et al. | 369/53.37 |
| 2004/0114472 A1 * | 6/2004 | Wang et al. | 369/13.26 |
| 2006/0146669 A1 * | 7/2006 | Wang et al. | 369/47.5 |
| 2007/0230524 A1 * | 10/2007 | Li et al. | 372/38.01 |
| 2009/0135865 A1 * | 5/2009 | Hsu et al. | 372/29.014 |

FOREIGN PATENT DOCUMENTS

| | | |
|---|---|---|
| JP | S62-066424 A | 3/1987 |
| JP | H06-338073 A | 12/1994 |
| JP | 2005-222594 A | 8/2005 |

* cited by examiner

*Primary Examiner* — Thomas Alunkal
(74) *Attorney, Agent, or Firm* — Judge Patent Associates

(57) ABSTRACT

An optical information record/playback device of the present invention includes: a light source; a current driver for supplying current to the light source; an optical system for condensing light from the light source onto a recording medium; a monitoring section for monitoring light emission power of the light source; a current driver control section for controlling output current of the current driver; and an arithmetic/control section for controlling an operation of the current driver control section. Before recording information, the arithmetic/control section sequentially conducts a first test light-emission to cause the light source to emit light by using a closed loop circuit and a second test light-emission to cause the light source to emit light by using an open loop circuit, and compares first and second sampling values, which are respectively obtained by sampling the outputs of the monitoring section during the first and second test light-emissions.

13 Claims, 8 Drawing Sheets

F I G. 1
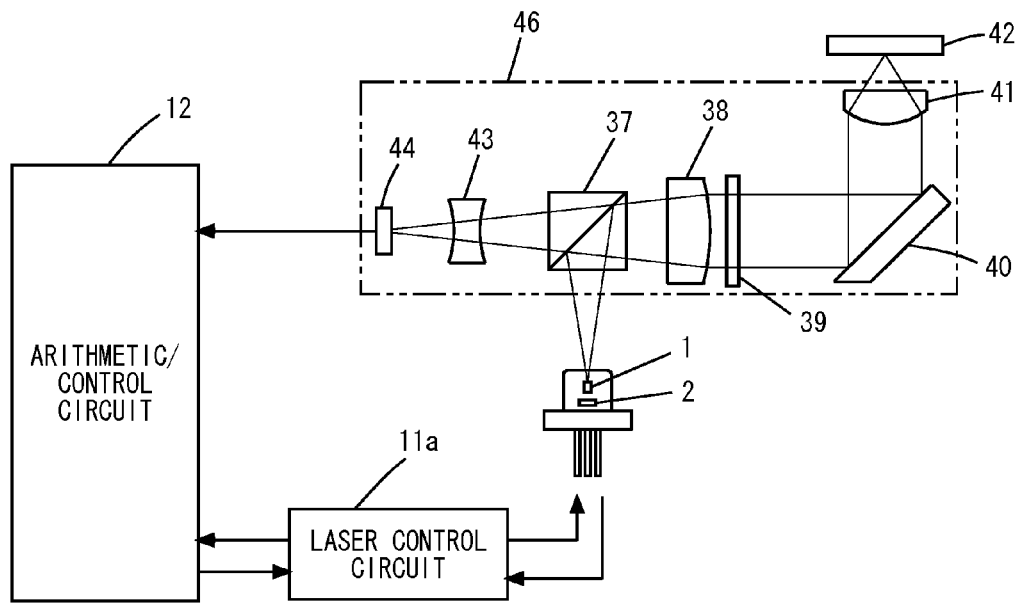

OPTICAL INFORMATION RECORD/PLAYBACK DEVICE

BACKGROUND OF THE INVENTION

1. Field of the Invention

The present invention relates to optical information record/playback devices for recording and playing back information to/from recording media by using light beams.

2. Description of the Background Art

In recent years, optical information record/playback devices for recording and playing back information such as videos, images, and audio by using light beams are widely used. Recording medium standards include, for example, compact disc (hereinafter, abbreviated as "CD"), Digital Versatile Disc (hereinafter, abbreviated as "DVD"), and Blu-ray Disc (hereafter, abbreviated as "BD"). In optical information record/playback devices, light from a semiconductor laser light source is condensed by an optical system and irradiated onto a recording medium, and reflected light from the recording medium is received by a photodetector to play back information. For recording, a light beam having power higher than that used for playback is irradiated onto a recording medium, and information is recorded by changing the structure, shape, reflectance, or the like of a portion of the recording medium on which the light has been irradiated. Here, the power of the laser irradiated on the recording medium is generally controlled through digital arithmetic processing.

Laser power control of an optical information record/playback device is described in the following by using FIG. 7.

FIG. 7 is a block diagram showing a conventional laser power control device for controlling laser power through digital arithmetic processing.

As shown in FIG. 7, the laser power control device includes an arithmetic/control circuit 22, a D/A (digital-to-analog) conversion circuit 23, resistances R1 and R2, a laser driving current source 24, a switch 32, and a semiconductor laser 1.

The D/A conversion circuit 23 includes a DATH circuit 25 for determining current required for reaching threshold power of the semiconductor laser 1, a DARD circuit 26 for determining playback-current, a DABS circuit 27 for determining bias current, and a DAPK circuit 28 for determining peak current.

The laser driving current source 24 includes a playback-current source 29 for supplying playback-current, a bias current source 30 for supplying bias current, and a peak current source 31 for supplying peak current.

The resistances R1 and R2 are resistances for adding outputs of the DARD circuit 26 and the DATH circuit 25 in the D/A conversion circuit 23.

In accordance with inputted data, the switch 32 turns ON or OFF peak current that flows in the semiconductor laser 1 from the peak current source 31.

Furthermore, the laser power control device includes a photodiode 2 for monitoring power of laser light outputted from the semiconductor laser 1, a current-voltage conversion circuit 33 for converting monitor current from the photodiode 2 into voltage, a switch 35, and an A/D (analog-to-digital) conversion circuit 36.

The monitor current outputted from the photodiode 2 is converted into voltage in the current-voltage conversion circuit 33, then passes through a variable resistance that absorbs variation in monitor efficiency, and is added to an amplifying circuit 34 of, for example, ten times.

When playback is to be carried out, a LOW level WTGT signal is supplied to the switch 35 to allow conduction between terminals a and b; and when recording is to be conducted, a HI level WTGT signal is supplied to the switch 35 to allow conduction between terminals a and c.

The A/D conversion circuit 36 conducts A/D conversion on an output signal from the terminal a of the switch 35, and outputs it to the arithmetic/control circuit 22 consisting of a microprocessor (CPU) or a digital signal processor (DSP).

The arithmetic/control circuit 22 can monitor the power of the semiconductor laser 1 based on the output from the A/D conversion circuit 36.

The operation of the laser power control device shown in FIG. 7 is divided into three modes: a playback-power control mode, a power learning mode, and a record-power control mode.

First, in the playback-power control mode, the arithmetic/control circuit 22 monitors the output (corresponds to light emission power of the semiconductor laser 1) of the A/D conversion circuit 36, and controls the outputs of the DATH circuit 25 and the DARD circuit 26 so as to maintain a playback-power P0 of the semiconductor laser 1. Here, the output values of the DATH circuit 25 and the DARD circuit 26 causing the semiconductor laser 1 to emit light with an output at the playback-power P0 are obtained when the device is assembled and calibrated, and are pre-stored in a memory inside the arithmetic/control circuit 22.

Next, in the power learning mode, the playback-power control mode is cancelled, and the outputs of the DATH circuit 25 and the DARD circuit 26 for the playback-power control mode are maintained. Then, the arithmetic/control circuit 22 obtains a slope Kr (slope=drive current/power) of the drive current around the playback-power P0, a slope Kb of the drive current around bias power Pb, and a slope Kp of the drive current around peak power Pp. The values of the obtained Kr, Kb, and Kp are stored in the memory inside the arithmetic/control circuit 22.

Then, in the record-power control mode, similar to the power learning mode, the playback-power control mode is cancelled, and the outputs of the DATH circuit 25 and the DARD circuit 26 for the playback-power control mode are maintained. By using Kb and Kp obtained in the previous power learning mode, the arithmetic/control circuit 22 obtains drive currents corresponding to desired bias power and peak power, and configures the outputs of the DABS circuit 27 and the DAPK circuit 28.

The configuration and the operation of the above described conventional laser power control device are disclosed in, for example, Japanese Laid-Open Patent Publication No. H6-338073.

FIG. 8 is a block diagram showing a laser power control circuit used in a typical playback-only device.

In the laser power control circuit shown in FIG. 8, the semiconductor laser 1 emits light upon receiving current from a current driver 10. The current driver 10 outputs current in accordance with voltage determined by a transistor 8 and a resistance 9. The light emitted from the semiconductor laser 1 is received by the photodiode 2. Photocurrent generated at the photodiode 2 is converted into voltage by a variable resistance 3, and is conducted to an inverting input of an operational amplifier 6. Voltage configured by a current source 4 and a variable resistance 5 is supplied to the other input of the operational amplifier 6, which is a non-inverting input. The output of the current driver is feedback-controlled such that these voltage values match. As a result, the output of the semiconductor laser 1 is controlled to be a desired value by the output of the current source 4 and by the values of the variable resistances 3 and 5.

Optical information record/playback devices are widely used as being incorporated in various products including personal computers, AV players, AV recorders, and the like. However, those that are currently most widely used in the world are playback-only devices mounted on AV players and home video-game machines. Since demands are extremely high to reduce prices of products that have entered a widespread-use period such as in the case with the playback-only devices, it is conceivable that demands to reduce prices of optical information record/playback devices having both functions of recording and playing back information will increase as they become widely used.

However, as described with FIG. 7, conventional laser power control devices for recording and playing back have a configuration greatly different from typical playback-only laser power control devices (FIG. 8), and require complicated arithmetic processing systems and many dedicated circuits to conduct light emission control at record-power. Therefore, if conventional laser power control devices are used, the final products, i.e., the optical information record/playback devices, become expensive, and so that it becomes difficult to attain cheap optical information record/playback devices.

SUMMARY OF THE INVENTION

An object of the present invention is to provide a cheap optical information record/playback device capable of both recording and playing back.

The present invention relates to an optical information record/playback device for recording and playing back information by irradiating light onto a recording medium. The optical information record/playback device includes a light source, a current driver for supplying current to the light source, an optical system for condensing light from the light source onto the recording medium, a monitoring section for monitoring light emission power of the light source, a current driver control section for controlling output current of the current driver, and an arithmetic/control section for controlling an operation of the current driver control section. The light source, the current driver, the monitoring section, and one portion of a circuit in the current driver control section form a closed loop circuit for bringing the light emission power of the light source close to a target value based on an output of the monitoring section. Furthermore, the light source, the current driver, and another portion of the circuit in the current driver control section form an open loop circuit for supplying a constant current to the light source. Before recording information, the arithmetic/control section sequentially conducts a first test light-emission of causing the light source to emit light by using the closed loop circuit and a second test light-emission of causing the light source to emit light by using the open loop circuit, and the arithmetic/control section compares a first sampling value obtained by sampling the output of the monitoring section in a period during the first test light-emission to a second sampling value obtained by sampling the output of the monitoring section in a period during the second test light-emission.

The optical information record/playback device of the present invention compares the first sampling value measured by using the closed loop circuit to the second sampling value measured by using the open loop circuit, and determines light emission intensity used when recording information. With such a configuration, a cheap optical information record/playback device capable of both recording and playing back can be attained by implementing a small change of adding an open loop circuit to a circuit used in a playback-only device.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 shows a configuration of an optical information record/playback device according to Embodiment 1;

DESCRIPTION OF THE PREFERRED EMBODIMENTS

Figure 2:
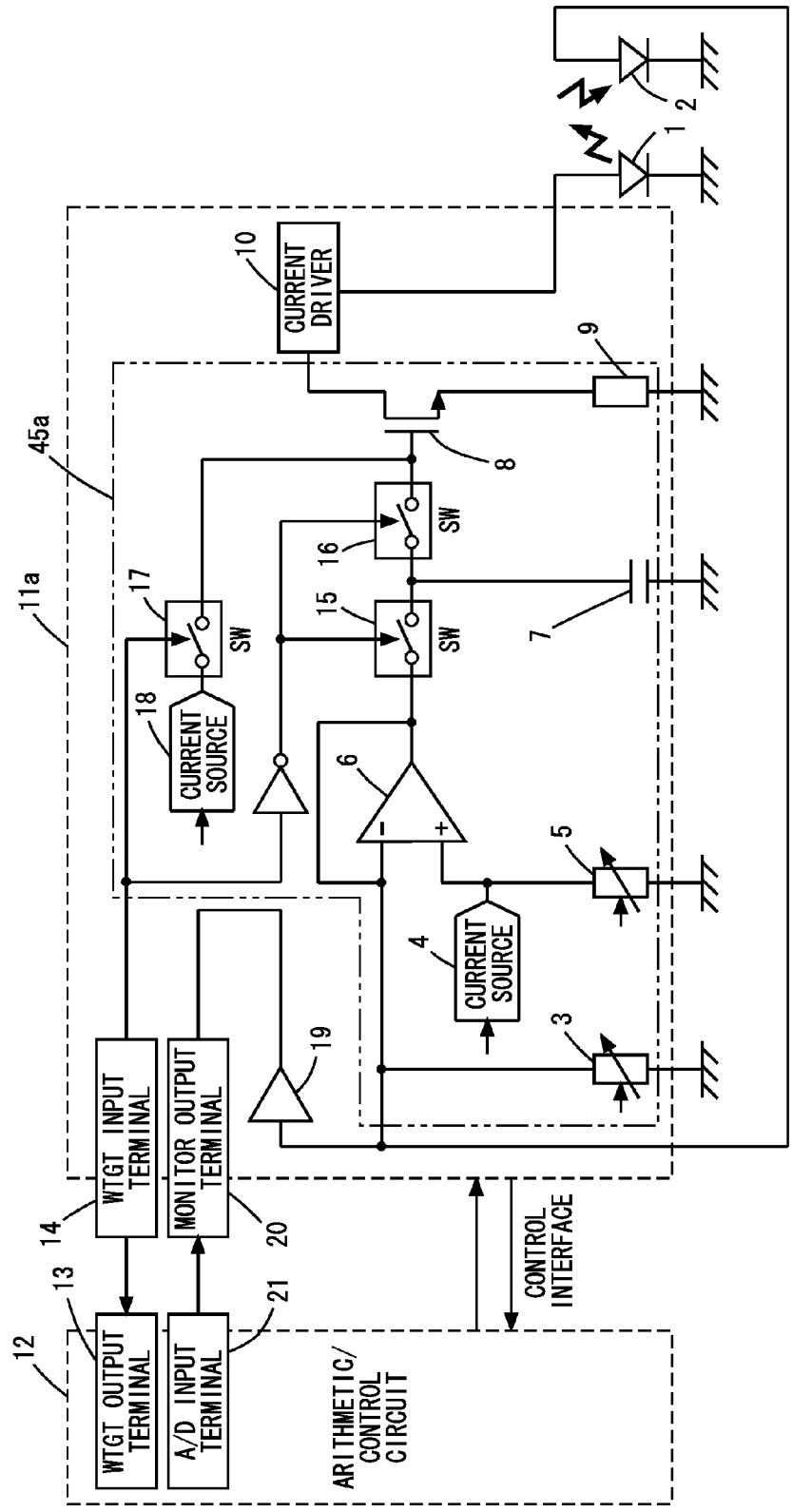
FIG. 2 is a block diagram of a laser control circuit shown in FIG. 1.

Embodiments of the present invention are described in the following with reference to the drawings. It should be noted that those having identical reference characters in the drawings indicate those that are identical or equivalent. Furthermore, the following embodiments are merely examples that embody the present invention and do not limit the technical scope of the present invention.

Embodiment 1

FIG. 1 shows a configuration of an optical information record/playback device according to Embodiment 1.

The optical information record/playback device shown in FIG. 1 includes a semiconductor laser 1, a photodiode 2, a laser control circuit 11a, an arithmetic/control circuit 12, an optical system 46, and a photodetector 44. The optical system 46 includes a polarization beam splitter 37, a collimating lens 38, a wave plate 39, a mirror 40, an objective lens 41, and a cylindrical lens 43.

Light emitted from the semiconductor laser 1, which is a light source, is reflected by the polarization beam splitter 37, and the reflected light is converted into a substantially parallel light beam by the collimating lens 38. The light emitted from the collimating lens 38 passes through the wave plate 39, is reflected by the mirror 40, and is condensed on an information recording surface of a recording medium 42 by the objective lens 41. Light reflected by the recording medium 42 follows a reverse-route, and enters the polarization beam splitter 37. However, since the polarization state of returning light is changed by an action of the wave plate 39, much of the returning light reaching the polarization beam splitter 37 passes through the polarization beam splitter 37, and enters the photodetector 44 via the cylindrical lens 43. Since the configuration of the photodetector 44 and the detection principles of RF signals, focal error signals, and tracking error signal are already publicly known, and since detection principles of those are not an essence of the present invention, detailed description of those are omitted.

Drive current of the semiconductor laser 1 is supplied from the laser control circuit 11a. One part of the light emitted from the semiconductor laser 1 is received by the photodiode 2 and is returned to the laser control circuit 11a as a feedback. In addition, the arithmetic/control circuit 12 manages the control of the whole system, including control of the laser control circuit 11a, tracking control, focal control, and calculation of signals from the photodetector 44.

FIG. 2 shows a configuration of the laser control circuit 11a shown in FIG. 1.

The laser control circuit 11a includes a current driver 10 for supplying current to the semiconductor laser 1, a current driver control circuit 45a for controlling output current of the current driver 10, a WTGT input terminal 14, an amplifier 19, and a monitor output terminal 20. In the circuit shown in FIG. 2, a closed loop circuit is formed by the semiconductor laser 1, the current driver 10, one portion of a circuit included in the current driver control circuit 45a, and the photodiode 2. In addition, an open loop circuit is formed by the semiconductor laser 1, the current driver 10, and another portion of the circuit included in the current driver control circuit 45a.

The current driver control circuit 45a includes, as circuit elements forming one portion of the closed loop circuit, an operational amplifier 6, a variable resistance 3 connected to an inverting input of the operational amplifier 6, a current source 4 and a variable resistance 5 connected to a non-inverting input of the operational amplifier 6, switches 15 and 16 connected in series between an output of the operational amplifier 6 and a gate of a transistor 8, a capacitor 7, the transistor 8, and a resistance 9. The inverting input of the operational amplifier 6 is connected to the photodiode 2. In addition, the current driver control circuit 45a includes, as circuit elements forming one portion of the open loop circuit, a current source 18, and a switch 17. Signals from the arithmetic/control circuit 12 are inputted into the current sources 4 and 18, and the output of the current driver 10 is controlled based on the input signals. For example, D/A converters with configured step number n can be used as the current sources 4 and 18. In such a case, the output of the current driver 10 can be adjusted in n stages, in response to the step number inputted from the arithmetic/control circuit 12.

The WTGT input terminal 14 is connected to a WTGT output terminal 13 of the arithmetic/control circuit 12. In the laser control circuit 11a, the WTGT input terminal 14 is connected to the switch 17 and is also connected to the switches 15 and 16 via an inverter. A WTGT signal outputted from the WTGT output terminal 13 is a signal for selecting whether to operate the closed loop circuit or to operate the open loop circuit. When playing back information from the recording medium, the closed loop circuit is selectively used by setting the WTGT signal to LOW level; and when recording information to the recording medium, the open loop circuit is selectively used by setting the WTGT signal to HI level. Furthermore, in a test light-emission period provided before starting the recording onto the recording medium, the closed loop circuit and the open loop circuit are sequentially used. Details of this are provided later.

An output from the photodiode 2 is inputted into the amplifier 19. The amplifier 19 amplifies voltage converted from photocurrent of the photodiode 2 with a predetermined gain, and outputs the amplified signal to the monitor output terminal 20. The monitor output terminal 20 is connected to an A/D input terminal 21 of the arithmetic/control circuit 12. The amplifier 19, the monitor output terminal 20, and the photodiode 2 form a monitoring section for monitoring light emission intensity of the semiconductor laser 1.

Figure 8:
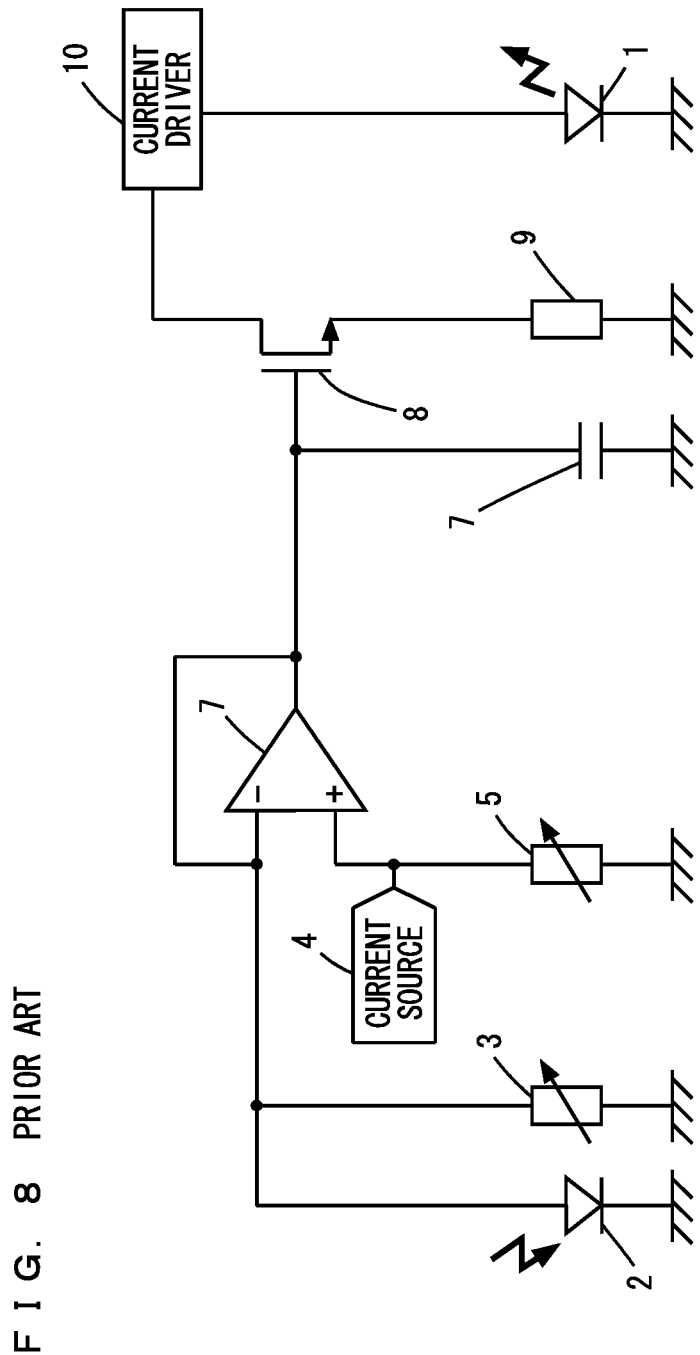
FIG. 8 is a block diagram showing a laser power control circuit used in a typical playback-only device.

When the WTGT signal outputted from the WTGT output terminal 13 is set at LOW level; the closed loop circuit is achieved by closing the switches 15 and 16, and opening the switch 17. In this case, similar to a typical playback-only power control circuit shown in FIG. 8, the output of the semiconductor laser 1 is controlled at a constant in accordance with an output of the current source 4 and the resistance values of the variable resistances 3 and 5. Here, the output of the current source 4 and the resistance values of the variable resistances 3 and 5 are configured by the arithmetic/control circuit 12 through a control interface.

On the other hand, when the WTGT signal outputted from the WTGT output terminal 13 is set at HI level, the open loop circuit is achieved by opening the switches 15 and 16 and closing the switch 17. In this case, since a gate voltage of the transistor 8 is determined by an output of the current source 18; the output of the current driver 10, namely the output of the semiconductor laser 1, is controlled by the output of the current source 18. The output of the current source 18 is configured by the arithmetic/control circuit 12 through a control interface. The photocurrent from the photodiode 2 is converted into voltage by the variable resistance 3, and the converted voltage is outputted from the monitor output terminal 20 via the amplifier 19 and inputted into the A/D input terminal 21 of the arithmetic/control circuit 12.

The following describes a configuration method of the output power (hereinafter, referred to as "record-power") of the semiconductor laser 1 when recording information onto the recording medium.

Figure 3:
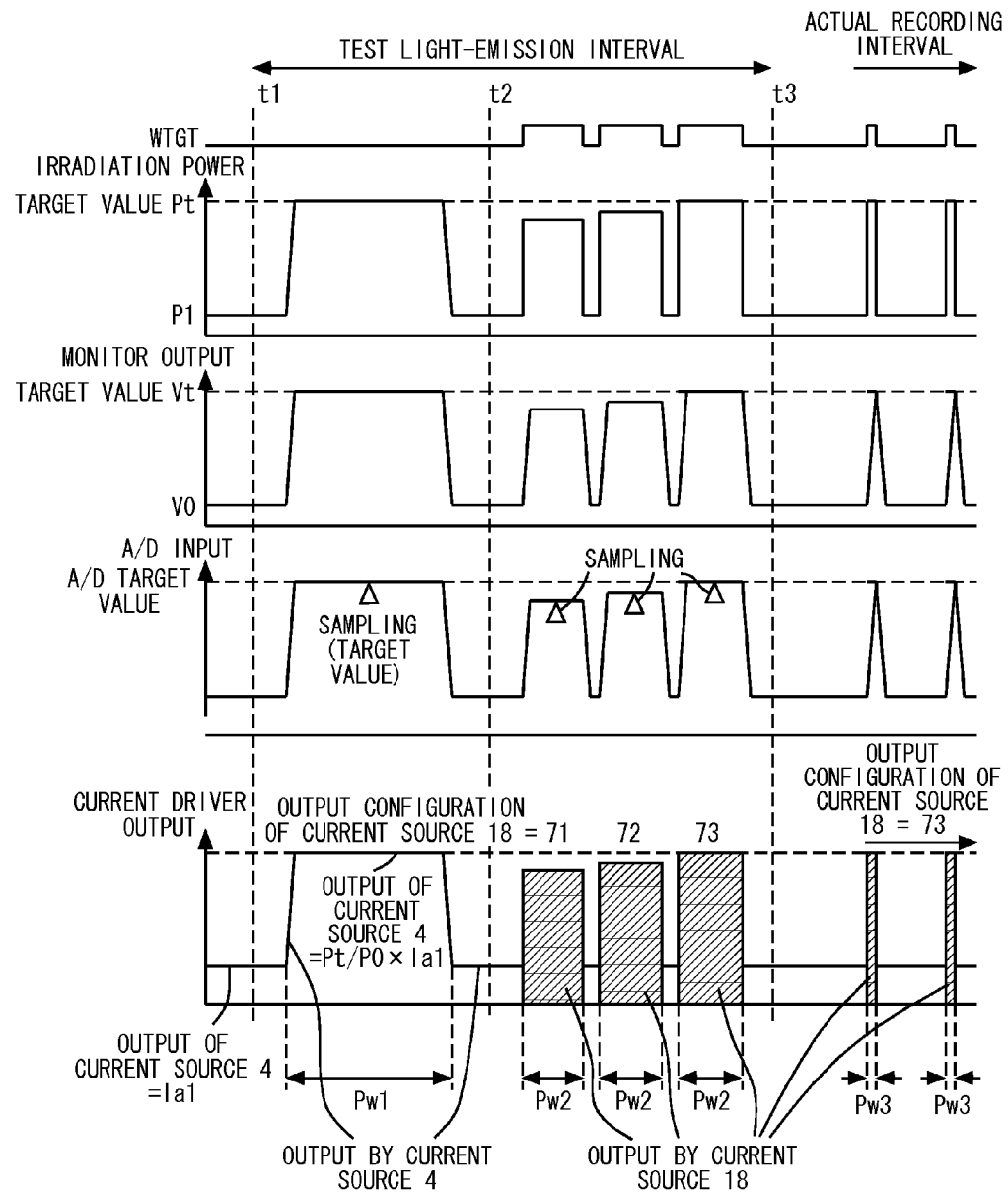
FIG. 3 is an illustrative diagram showing a record-power configuration method according to Embodiment 1.

FIG. 3 is an illustrative diagram showing the record-power configuration method according to Embodiment 1, and the vertical axis represents, sequentially from the top, WTGT signal, irradiation power against the recording medium, monitor output, A/D input, and current driver output. The horizontal axis represents time. Envisioned in FIG. 3 is a case where playing back information from the recording medium is conducted prior to time t1, and recording information onto the recording medium is conducted after time t3. A period between times t1 and t3 is a test light-emission period for determining the record-power for recording information onto the recording medium.

An output current value of the current source 4 to play back information from the recording medium is represented as Ia1, and the irradiation power against the recording medium is represented as P1. Since the light emission power of the semiconductor laser 1 is different in every product, the relationship between the irradiation power P1 and the output current value Ia1 of the current source 4 is obtained when the device is assembled and calibrated, and is stored in the memory inside the arithmetic/control circuit 12.

The test light-emission period consists of a first test light-emission period from time t1 to t2, and a second test light-emission period from time t2 to t3.

In the first test light-emission period, the arithmetic/control circuit 12 sets the WTGT signal to LOW level, and causes the semiconductor laser 1 to emit light (hereinafter, referred to as "first test light-emission") by using the closed loop circuit at an irradiation power Pt which is a target. Specifically, the first test light-emission is enabled by having the arithmetic/control circuit 12 configure the output current value of the current source 4 at (Pt/P1×Ia1). Then, an output value of the monitor output terminal 20 during the first test light-emission is sampled at the A/D input terminal 21 of the arithmetic/control circuit 12 to obtain a first sampling value. The first sampling value is stored in the memory inside the arithmetic/control circuit 12. The first sampling value is used as a target value for adjusting the light emission power of the semiconductor laser 1 when the semiconductor laser is caused to emit light by using the open loop circuit. When the sampling ends, the arithmetic/control circuit 12 restores the output current value of the current source 4 to Ia1 again.

In the second test light-emission period following the first test light-emission period, the arithmetic/control circuit 12 sets the WTGT signal to HI level, and causes the semiconductor laser 1 to emit light by only using the open loop circuit, and adjusts the light emission power of the semiconductor laser 1. As described above, for example, a D/A converter with a configured step number n can be used as the current source 18. In this case, the arithmetic/control circuit 12 can control the output current value of the current source 18 by providing the current source 18 with the step number. An initial value Sinit of the step number provided to the current source 18 is obtained from the following formula (1).

$$Sinit = (Pt/(\eta LD \times \eta OPT) + Ith)/Imax \times n \quad (1)$$

Pt: power of light beam irradiated onto the recording medium when recording information (mW)
ηLD: light emission efficiency of the light source (mW/mA)
ηOPT: light utilization efficiency of the optical system (power irradiated onto the recording medium/light emission power of the light source)
Imax: maximum current value of the current source 18 (mA)
Ith: threshold current of the semiconductor laser 1 (mA)
n: configured step number of the current source 18

For example, in a case where Pt=5 mW, ηLD=1.4 (mW/mA), ηOPT=0.1, Imax=100 mA, Ith=20 mA, and n=127 (a 7 bit D/A converter is used as the current source 18), the Sinit is calculated as 71.

Among the above described parameters, since ηLD, ηOPT, and Imax vary depending on individual devices, the target irradiation power of Pt cannot necessarily be obtained even if the output current value of the current source 18 is configured based on the above described formula (1). Therefore, the arithmetic/control circuit 12 sets the WTGT signal to HI level, provides the current source 18 with the initial step number Sinit to conduct the second test light-emission, and conducts a sampling on the output value of the A/D input terminal 21 to obtain a second sampling value. The arithmetic/control circuit 12 compares the second sampling value and the first sampling value acquired at the first test light-emission, and increases or decreases the output current value of the current source 18 by a predetermined level in a stepwise manner until the difference between the first sampling value and the second sampling value becomes equal to or smaller than a predetermined value.

In the example in FIG. 3, the second test light-emission is repeated three times. First, the arithmetic/control circuit 12 provides the current source 18 with 71 (initial value Sinit) as the step number to conduct the second test light-emission. In this case, the obtained second sampling value is smaller than the first sampling value which is the target, and the difference between the first sampling value and the second sampling value is larger than a predetermined accepted value. Therefore, the arithmetic/control circuit 12 increases the step number to 72, which is provided to the current source 18, and conducts the second test light-emission again. At this point, the obtained second sampling value is still smaller than the first sampling value, and the difference between the first sampling value and the second sampling value is larger than the predetermined accepted value. Thus, the step number provided to the current source 18 is increased to 73, and the second test light-emission is further conducted. At this point, since the difference between the obtained second sampling value and the first sampling value is smaller than the predetermined accepted value, the step number to be provided to the current source 18 when recording information is determined as 73, and the second test light-emission ends.

As described above, the arithmetic/control circuit 12 conducts the second test light-emission for multiple times by using the open loop circuit, and repeatedly compares the first sampling value and the second sampling value and repeatedly adjusts of the output current value of the current source 18 based on the comparison result. The target irradiation power Pt is obtained by conducting this control in the second test light-emission period.

Other than that described in the above described example, various methods can be used for an algorithm for searching the output configuration of the current source 18 so as to match the target irradiation power Pt based on the comparison of the first sampling value and the second sampling value. The example in FIG. 3 describes a method in which the second sampling value is brought close to the first sampling value by changing the step number provided to the current source 18 in a stepwise manner. However, for example, a reduction in the searching time can be expected if the step number provided to the current source 18 is changed by two or more each time when the difference between the first sampling value and the second sampling value is equal to or larger than the predetermined value. Alternatively, a similarly effective method is one in which, with regard to the output current value of the current source 18, a change level (or step number) of the output current value corresponding to the difference between the first sampling value and the second sampling value is obtained through calculation, and the current source 18 is controlled based on the obtained calculation result. There are various publicly known methods that can be used as search algorithms, and since these search algorithms themselves are not an essence of the present invention, detailed descriptions thereof are omitted.

Beyond time t3, which is after the end of the second test light-emission period, recording information onto the recording medium is conducted by using the step number obtained in the second test light-emission period.

A light emission time during a test light-emission period and a light emission time during information-recording are described in the following.

A test light-emission time Pw1 during the first test light-emission period and a test light-emission time Pw2 during the second test light-emission period satisfy the following condition.

$$Pw1 \geq Pw2 \quad (3)$$

Furthermore, if a record-power emission time Pw3 during recording of information onto the recording medium is added, the following condition is satisfied.

$$Pw1 \geq Pw2 > Pw3 \quad (4)$$

An appropriate value of the test light-emission time Pw1 during the first test light-emission period is about 10 to 30 ms. Since power control is conducted between two points, P1 and Pt, by having a closed loop control in this interval, a time period of several ms is necessary for the power to settle. This settling time depends on the band in which the control is conduced, and the "several ms" originates from the fact that a closed loop is generally formed at a gain crossover frequency from several KHz to less than 20 KHz in a laser power control. Therefore, a case will be discussed here in which about 4 to 5 ms is required for the settling from P1 to Pt and for the settling from Pt to P1. Sampling of A/D target values is conducted in a peak power portion in the test light-emission time Pw1. Although the sampling time differs depending on the A/D converter, the time for a single measurement is generally several μs to several tens of μs. Here, reliability and accuracy of the sampling result can be ensured by conducting the sampling measurement for multiple times. In addition, the reliability of the sampling result can be further enhanced by setting a waiting time before the start of the sampling, in order to take into consideration of the variation of the power settling time from P1 to Pt. If 1 ms is secured for the peak power light-emission time for the sampling, the value of Pw1 can be configured, for example, as described next.

$Pw1=4.5$ ms ($P1$ to $Pt$ transition time)+1 ms (peak power light-emission time)+4.5 ms ($Pt$ to $P1$ transition time)=10 ms In a system in which, the time for a single sampling of the A/D converter is 50 µs, the samplings is conducted for five times, and the waiting time before the start of the sampling is 50 µs; a total time of 300 µs is necessary for the sampling. A sufficiently stable sampling can be conducted in the peak power light emission period if 1 ms is secured as the peak power light-emission time. In addition, if there is extra time that can be allocated for the test light-emission, or if a cheaper and slower A/D converter is to be used, the Pw1 may be set to about 30 ms with additional extra time.

An appropriate value of the test light-emission time Pw2 in the second test light-emission period is about 1 to 5 ms. Since the current driver output is switched due to switching of the control state from the closed loop to the open loop by the WTGT signal in this period, power transition from P1 to Pt and Pt to P1 can be conducted at several µs or less. Therefore, if the peak power time for conducting the sampling is set at 1 ms similar to that described above, 1 ms is sufficient for Pw2, since the power transition time from P1 to Pt and Pt to P1 can almost be ignored. Here, Pw2 may be as long as about 5 ms with extra time as well.

Since the record-power emission time Pw3 during recording of information onto the recording medium is from several ns to about several tens of µs at most, Pw3 is much shorter than the test light-emission time Pw1 and Pw2. In the latest recording devices, recording pulses in the record-power emission time Pw3 is directly received by photo diodes and photo ICs to control the record-power in real-time. In order to achieve such a configuration, it is necessary to have photodiodes and photo ICs having extremely high speed response performance, as well as high speed sampling circuits and arithmetic circuits.

On the other hand, by using the configuration described in the present embodiment, the control of the record-power can be conducted by slightly changing a control circuit of a playback-only device. For example, since a high-speed response is not necessary for the photodiode 2 in FIG. 2, a back-light monitor photo diode which is placed in a semiconductor laser package and which is generally used in playback-only devices can be used. The laser control circuit 11a is also obtained by merely adding, to the circuit of the playback-only device (refer to FIG. 8), the current source 18, the switches 15 to 17, the amplifier 19 for monitor outputs, the WTGT input terminal 14, and the monitor output terminal 20. Although the WTGT output terminal 13 and the A/D input terminal 21 are necessary for the arithmetic/control circuit 12, they can be substituted with generic I/O terminals when an optical disc control LSI is used. Therefore, by using the LSI of a playback-only device as it is and by adding the above described content to the firmware for control, a device capable of both recording and playing back can be attained. Thus, a recording device can be attained with only a small circuit addition while keeping components common with a playback-only device.

It should be noted that, in the test light-emission period (time t1 to t3), recording onto the recording medium caused by the test light-emission can be avoided by increasing, to a level faster than in a normal operation, the relative speed (disc rotational speed in the case with the optical disc device) between the irradiation beam and the recording medium. Alternatively, in the test light-emission period, recording onto the recording medium caused by the test light-emission can also be avoided by turning OFF focal position control of the irradiation beam condensed on the recording medium, and actively shifting an information recording surface of the recording medium away from a focal position of the irradiation beam.

There are upper and lower limits to an input range of the A/D input terminal 21 in the arithmetic/control circuit 12, and if a range of the record-power is broad, there may a case where the upper and lower limits of a monitor output exceed the upper and lower limits of the record-power. In such a case, the monitor output can be fitted within the dynamic range of the A/D input terminal by adding a gain-switching section to the amplifier 19, and switching the gain when a predetermined record-power is exceeded.

In the above described example, the relationship between the irradiation power P1 and the output current value Ia1 of the current source 4 when conducting a playback-power light emission is stored, as preestablished information relating to power, in the memory inside the arithmetic/control circuit 12 when the device is assembled and calibrated. The relationship between the irradiation power P1 and the output current value Ia1 of the current source 4 is used to calculate the output (or step number to be inputted) of the current source 4 when causing the semiconductor laser 1 to emit light at the target power Pt in the first test light-emission period. However, in reality, the current source 4 may output a micro current when the output is configured as zero (in a case where there is an offset), or may not be able to obtained a desired output even when the output is increased (in a case where there is a deadband). In such cases, configuring the current value to Pt/P1×Ia1 in order to obtain the target power Pt results in an error. In order to suppress this record-power configuration error, it is effective to have another known point information regarding the record-power range. Namely, by adding the relationship between an output Ia2 of the current source 4 and an irradiation power P2 (around Pt), two point information (Ia1, P1) and (Ia2, P2) are stored in the memory inside the arithmetic/control circuit 12 when the device is assembled and calibrated. A high precision configuration of the record-power is possible for the configuration of the record-power Pt, by using, as a standard, P2 which is closer to Pt and configuring the output current of the current source 4. Furthermore, an even higher precision configuration of the record-power is also possible when three or more point relationships between the irradiation power and the output of the current source 4 are provided.

The laser control circuit 11a and the arithmetic/control circuit 12 may be formed on the same integrated circuit. Furthermore, respective circuit elements of the laser control circuit 11a may be formed on the same integrated circuit, may be divided and formed on a plurality of integrated circuits, or one part thereof may be formed from a discrete element.

Furthermore, the laser control circuit 11a shown in FIG. 2 is a simplified block diagram for showing the operation of the circuit, and it is understood that, in an actual configuration, circuit elements such as resistances, capacitors, and the like which are not shown may be used.

Embodiment 2

Figure 4:
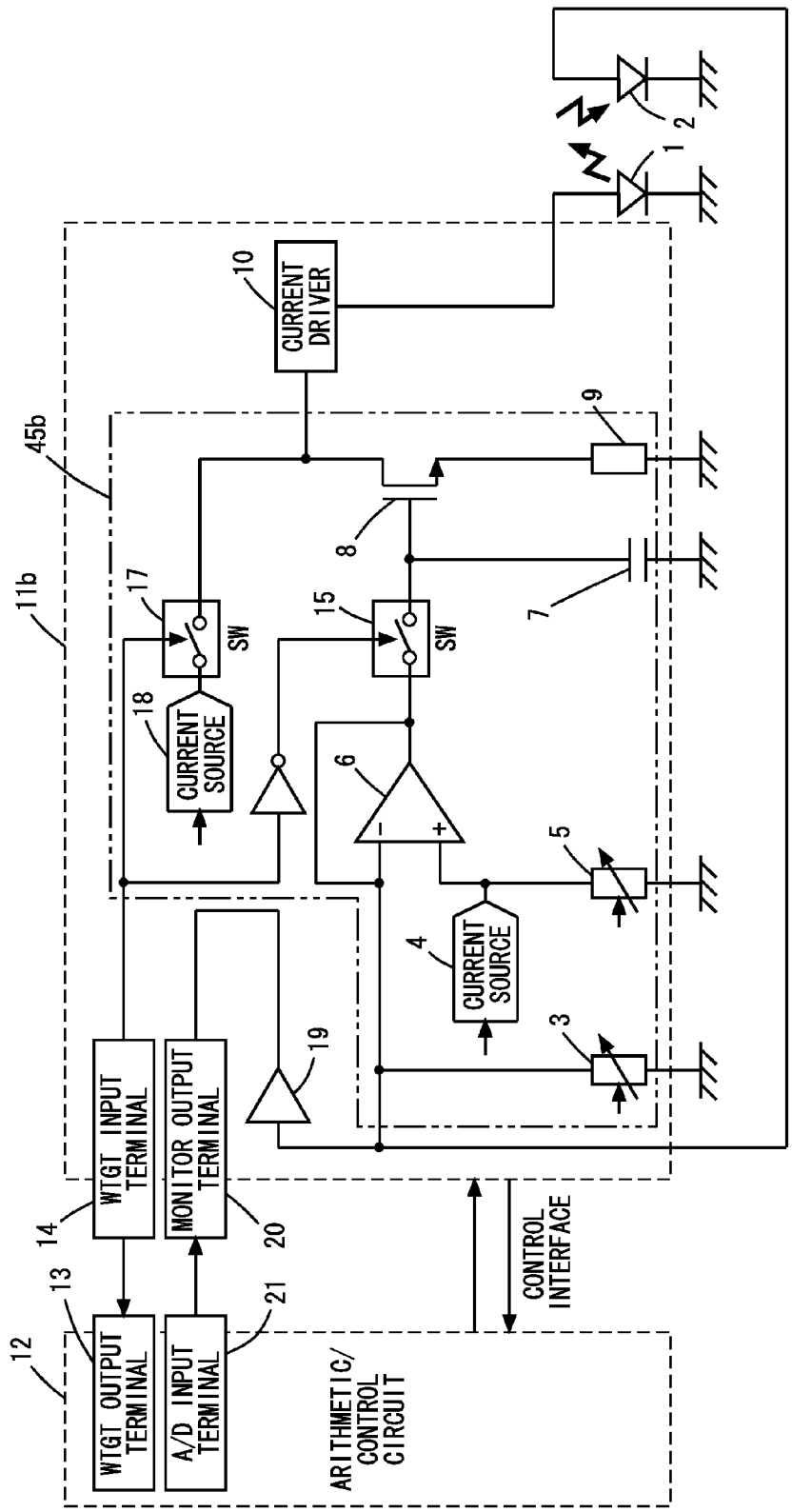
FIG. 4 is a block diagram of a laser control circuit according to Embodiment 2.

FIG. 4 shows a configuration of a laser control circuit 11b according to Embodiment 2. The laser control circuit 11b shown in FIG. 4 is obtained by removing the switch 16 from the laser control circuit 11a shown in FIG. 2 and by having the capacitor 7 constantly connected to a gate electrode of the transistor 8. The description in the following centers on the difference between the present embodiment and Embodiment 1.

First, when the WTGT signal outputted from the WTGT output terminal 13 is set at LOW level, the switch 15 is closed and the switch 17 is opened. In this case, similar to the conventional playback-only power control circuit shown in FIG. 8, the output of the semiconductor laser 1 is controlled at a constant in accordance with the output of the current source 4 and the resistance values of the variable resistances 3 and 5. Here, the output of the current source 4 and the resistance values of the variable resistances 3 and 5 are configured by the arithmetic/control circuit 12 through a control interface.

On the other hand, when the WTGT signal outputted from the WTGT output terminal 13 is set at HI level, the switch 15 is opened and the switch 17 is closed. When the switch 15 is opened, the gate voltage of the transistor 8 is held by the capacitor 7. Therefore, even when the WTGT signal is set to HI level, the output of the current driver 10, i.e., the output of the semiconductor laser 1, obtained immediately before the WTGT signal has been set at HI level is held.

When the switch 17 is closed, the output of the current driver 10, i.e., the output of the semiconductor laser 1, increases by a level equal to the output of the current source 18. The output of the current source 18 is also configured by the arithmetic/control circuit 12 through a control interface. Voltage obtained by voltage-converting the photocurrent of the photodiode 2 by the variable resistance 3 is outputted from the monitor output terminal 20 via the amplifier 19, and is inputted into the A/D input terminal 21 of the arithmetic/control circuit 12.

The following describes a configuration method of the record-power.

Figure 5:
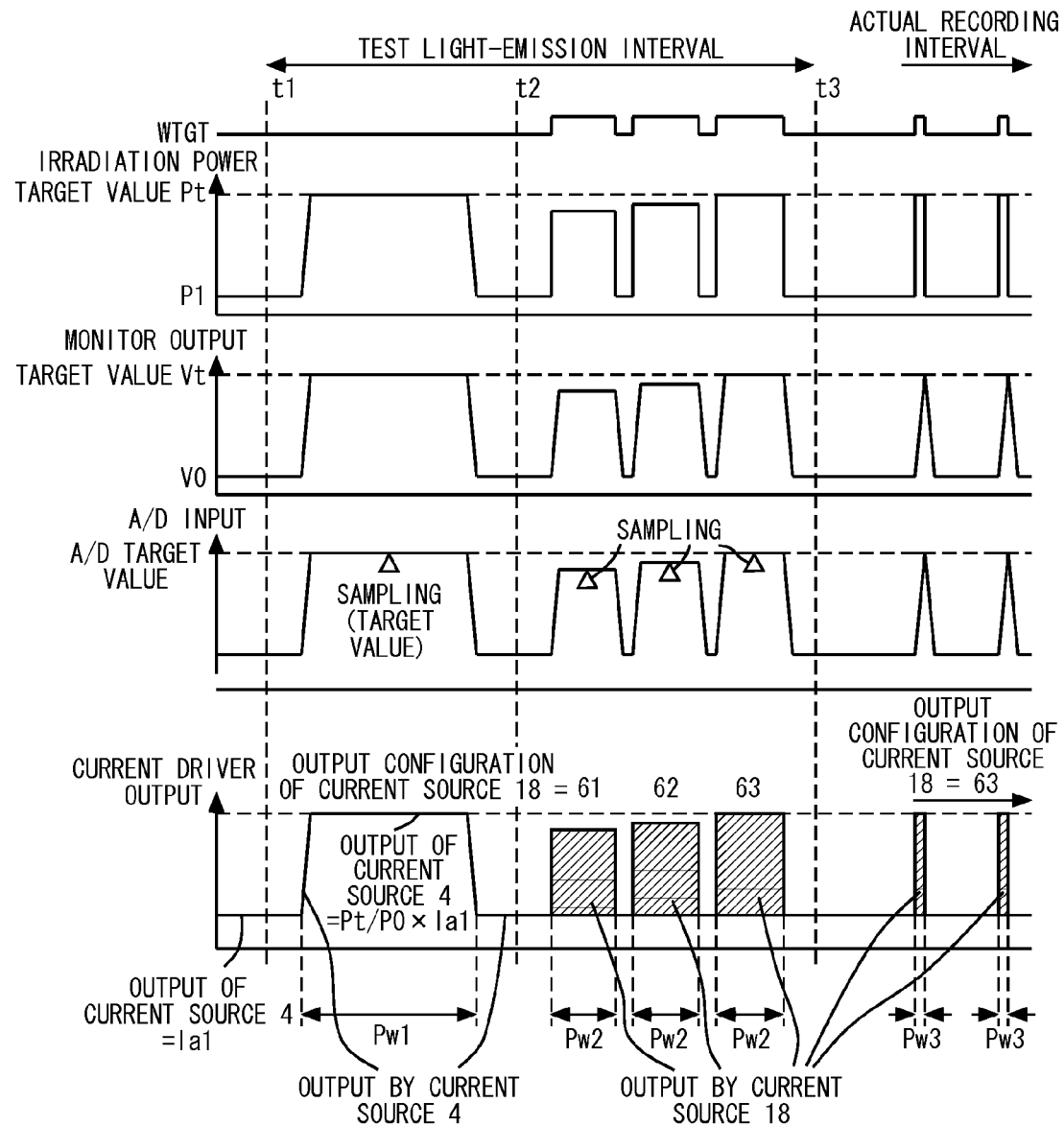
FIG. 5 is an illustrative diagram showing a record-power configuration method according to Embodiment 2.

FIG. 5 is an illustrative diagram showing the record-power configuration method according to Embodiment 2; and represented sequentially from the top in FIG. 5 are WTGT signal, irradiation power against the recording medium, outputs of the monitor output terminal, the A/D input terminal, and the current driver. The horizontal axis represents time.

The state prior to time t1 is a playback state. The irradiation power on the recording medium is represented as P1, when the output current value of the current source 4 during playback is Ia1. The relationship between the irradiation power P1 and the output Ia1 of the current source 4 is obtained when assembling and calibrating the device, and the output Ia1 is stored in the memory inside the arithmetic/control circuit 12.

In the first test light-emission period from time t1 to t2, it is possible to cause the semiconductor laser 1 to emit light at the target irradiation power Pt by configuring the output current value of the current source 4 to Pt/P1×Ia1. Sampling is conducted by the A/D input terminal of the arithmetic/control circuit 12 with regard to the monitor output during the first test light-emission, and the obtained value is stored inside the arithmetic/control circuit 12 as the first sampling value. The first sampling value is used as the target value when the semiconductor laser 1 is caused to emit light by using only the open loop circuit. When the sampling ends, the output of the current source 4 is restored to Ia1 again.

In the second test light-emission period from time t2 to t3, the WTGT signal is set to HI level and the output of the current source 18 is applied to the current driver 10. A D/A converter with a configured step number n can be used as the current source 18. In this case, the arithmetic/control circuit 12 can control the output current value of the current source 18 by providing the current source 18 with the step number. An initial value Sinit of the step number provided to the current source 18 is obtained from the following formula (2).

$$Sinit=(Pt-P1)/(\eta LD \times \eta OPT \times Imax) \times n \quad (2)$$

Pt: power of light beam irradiated onto the recording medium when recording information (mW)
ηLD: light emission efficiency of the light source (mW/mA)
ηOPT: light utilization efficiency of the optical system (power irradiated onto the recording medium/light emission power of the light source)
Imax: maximum current value of the driver output, which is configurable by the current source 18
n: configured step number of the current source 18

For example, in a case where Pt=5 mW, P1=0.3 mW, ηLD=1.4, ηOPT=0.1, Imax=70 mA, and n=127 (a 7 bit D/A converter is used as the current source 18), the Sinit is calculated as 61 from the above described formula (2).

However, among the above described parameters, since ηLD, ηOPT, and Imax vary depending on individual devices, the target irradiation power of Pt cannot necessarily be obtained even if the output current value of the current source 18 is configured based on the above described formula (2). Therefore, similar to Embodiment 1, the arithmetic/control circuit 12 repeats the second test light-emission for couple of times, acquires the second sampling value from the A/D input terminal 21, and brings the second sampling value close to the first sampling value acquired from the A/D input terminal 21 during the first test light-emission.

In the example in FIG. 5, when the second test light-emission is conducted by providing the current source 18 with a step number of 61, the second sampling value is smaller than the first sampling value which is the target, and the difference between the first sampling value and the second sampling value is larger than the predetermined accepted value. Therefore, the arithmetic/control circuit 12 increases the step number provided to the current source 18, to 62, and conducts the second test light-emission. Since the second sampling value obtained here is still smaller than the target value and the difference between the first sampling value and the second sampling value is larger than the predetermined accepted value, the arithmetic/control circuit 12 increases the step number provided to the current source 18, to 63, and conducts the test light-emission. At this point, since the difference between the obtained second sampling value and the first sampling value is equal to or smaller than the predetermined accepted value, the step number to be provided to the current source 18 when recording information is determined as 63, and the second test light-emission ends.

Preferable values of the test light-emission time Pw1 in the first test light-emission period and the test light-emission time Pw2 in the second test light-emission period are similar to those described in Embodiment 1. Similar to Embodiment 1, the test light-emission time Pw1 and Pw2, and the record-power emission time Pw3 satisfy the above described conditions (3) and (4).

In the present embodiment, since the operation current necessary to cause the semiconductor laser to emit light at the playback-power P1 is configured by the current source 4, the current driver output by the current source 18 is suppressed to a low level. In addition, the switch 16 shown in FIG. 2 is unnecessary. Therefore, a further simplification and price-reduction of the circuit are enabled, and changes required to convert a playback-only device into a record/playback device becomes minimal.

Also in the present embodiment, in the test light-emission period (time t1 to t3), recording onto the recording medium caused by the test light-emission can be avoided by increasing the relative speed (disc rotational speed in the case with the optical disc device) between the irradiation beam and the recording medium to a level faster than in a normal operation. Alternatively, in the test light-emission period, recording onto the recording medium caused by the test light-emission can also be avoided by turning OFF focal position control of the irradiation beam on the recording medium, and actively shifting the information recording surface of the recording medium away from the focal position of the irradiation beam.

Similar to Embodiment 1, the dynamic ranges of the monitor output and the A/D input terminal of the arithmetic/control circuit 12 can be matched, by adding a gain-switching section to the amplifier 19.

Furthermore, similar to Embodiment 1, a higher precision configuration of the record-power is possible when two, three, or more point relationships between the irradiation power and the output of the current source 4 are provided.

The laser control circuit 11b and the arithmetic/control circuit 12 may be formed on the same integrated circuit. Furthermore respective circuit elements of the laser control circuit 11b may be formed on the same integrated circuit, may be divided and formed on a plurality of integrated circuits, or one part thereof may be formed from a discrete element.

Furthermore, the laser control circuit 11b shown in FIG. 4 is a simplified block diagram for showing the operation of the circuit, and it is understood that, in an actual configuration, circuit elements such as resistances, capacitors, and the like which are not shown may be used.

Embodiment 3

Figure 6:
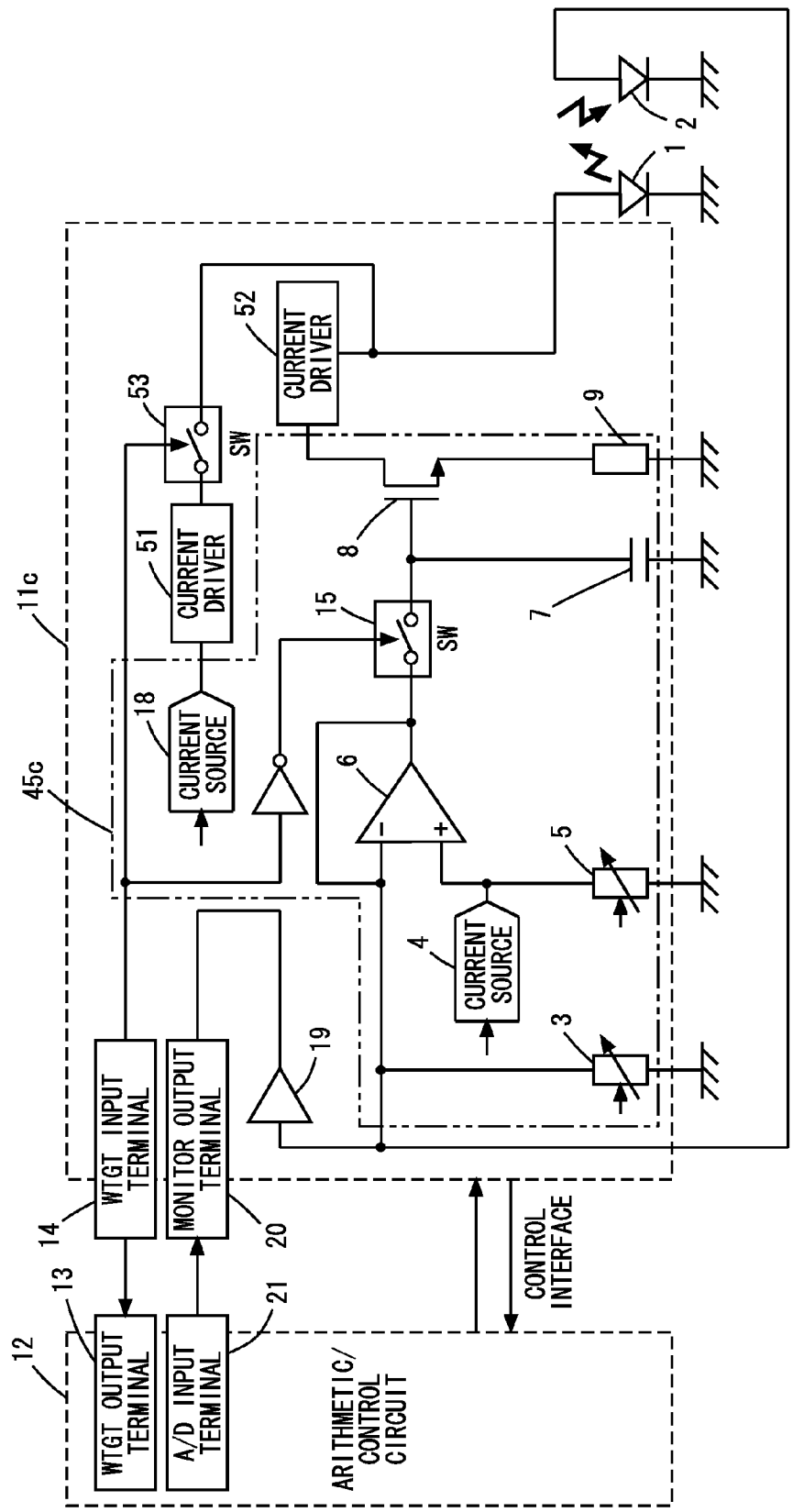
FIG. 6 is a block diagram of a laser control circuit according to Embodiment 3.
Figure 7:
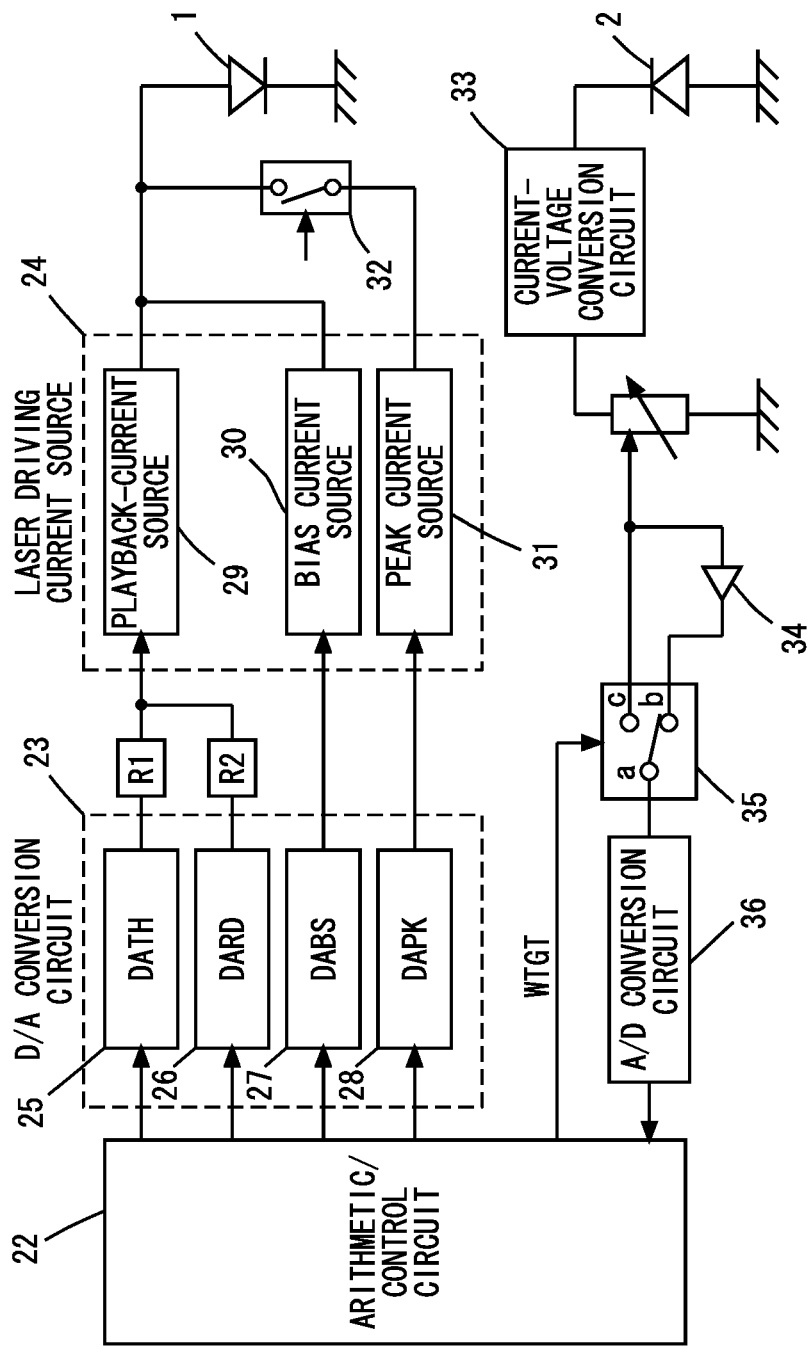
FIG. 7 is a block diagram showing a conventional laser power control device.

FIG. 6 shows a configuration of a laser control circuit 11c according to Embodiment 3. In the laser control circuit 11c according to the present embodiment, a first current driver 51 and a second current driver 52 are respectively provided to the closed loop circuit and the open loop circuit. The description in the following centers on the difference between the present embodiment and Embodiment 2.

Both the first current driver 51 and the second current driver 52 have the same function as the current driver 10 in Embodiment 2. The input of the first current driver 51 is connected to the output of the current source, and the output of the first current driver 51 is connected to the semiconductor laser 1 via a switch 53. Similar to Embodiment 2, the second current driver 52 is connected to the transistor 8 and the semiconductor laser 1.

When the WTGT signal outputted from the WTGT output terminal 13 is set at LOW level, the closed loop circuit is achieved by closing the switch 15 and opening the switch 53. At this point, the semiconductor laser is driven by the second current driver 52, and similar to the conventional playback-only power control circuit shown in FIG. 8, the output of the semiconductor laser 1 is controlled at a constant by the output of the current source 4 and the resistance values of the variable resistances 3 and 5. Here, the output of the current source 4 and the resistance values of the variable resistances 3 and 5 are configured by the arithmetic/control circuit 12 via a control interface.

On the other hand, when the WTGT signal outputted from the WTGT output terminal 13 is set at HI level, the open loop circuit is achieved by opening the switch 15 and closing the switch 53. When the switch 15 is opened, the gate voltage of the transistor 8 is held by the capacitor 7. Therefore, even when the WTGT signal is set to HI level, the output of the second current driver 52, i.e., the output of the semiconductor laser 1, obtained immediately before the WTGT signal has been set at HI is held.

When the switch 53 is closed, the output current of the first current driver 51 configured by the current source 18 is added to the output current of the second current driver 52, and the added current is supplied to the semiconductor laser 1. The output of the current source 18 is also configured by the arithmetic/control circuit 12 through a control interface. Voltage obtained by voltage-converting the photocurrent of the photodiode 2 by the variable resistance 3 is outputted from the monitor output terminal 20 via the amplifier 19, and is inputted into the A/D input terminal 21 of the arithmetic/control circuit 12.

In the present embodiment, since the first current driver 51 for supplying current to the semiconductor laser 1 when recording information is included independent from the second current driver 52 used when playing back information, the supply current can be directly switched by turning ON/OFF the switch 17, and thereby starting up and shutting down the record-power can be conducted at a higher speed.

The configuration method of the record-power here is similar to that described by using FIG. 5 of Embodiment 2, and thereby it will not be repeatedly described. Furthermore, preferable values of the test light-emission time Pw1 in the first test light-emission period and the test light-emission time Pw2 in the second test light-emission period are similar to those described in Embodiment 1. Similar to Embodiment 1, the test light-emission time Pw1 and Pw2, and the record-power emission time Pw3 satisfy the above described conditions (3) and (4).

Also in the present embodiment, in the test light-emission period (time t1 to t3 in FIG. 5), recording onto the recording medium caused by the test light-emission can be avoided by increasing the relative speed (disc rotational speed in the case with the optical disc device) between the irradiation beam and the recording medium to a level faster than in a normal operation. Alternatively, in the test light-emission period, recording onto the recording medium caused by the test light-emission can also be avoided by turning OFF focal position control of the irradiation beam on the recording medium, and actively shifting the recording medium away from the focal position of the irradiation beam.

Similar to Embodiment 1, the dynamic ranges of the monitor output and the A/D input terminal of the arithmetic/control circuit 12 can be matched, by providing a gain switching function to the amplifier 19.

Furthermore, similar to Embodiment 1, a higher precision configuration of the record-power is possible when two, three, or more point relationships between the irradiation power and the output of the current source 4 are provided.

The laser control circuit 11c and the arithmetic/control circuit 12 may be formed on the same integrated circuit. Furthermore, respective circuit elements of the laser control circuit 11c may be formed on the same integrated circuit, may be divided on a plurality of integrated circuits, or one part thereof may be formed from a discrete element.

Furthermore, the laser control circuit 11c shown in FIG. 6 is a simplified block diagram for showing the operation of the circuit, and it is understood that, in an actual configuration, circuit elements such as resistances, capacitors, and the like which are not shown may be used.

While the invention has been described in detail, the foregoing description is in all aspects illustrative and not restrictive. It will be understood that numerous other modifications and variations can be devised without departing from the scope of the invention.

What is claimed is:

1. An optical information record/playback device for recording and playing back information by irradiating light onto a recording medium, the optical information record/playback device comprising:
   a light source;
   a current driver for supplying current to the light source;
   an optical system for condensing light from the light source onto the recording medium;
   a monitoring section for monitoring light emission power of the light source;
   a current driver control section for controlling output current of the current driver; and
   an arithmetic/control section for controlling an operation of the current driver control section, wherein:
   the light source, the current driver, the monitoring section, and a portion of a circuit in the current driver control section form a closed loop circuit for bringing the light emission power of the light source close to a target value based on an output of the monitoring section,
   the light source, the current driver, and another portion of the circuit in the current driver control section form an open loop circuit for supplying a constant current to the light source,
   the current driver control section includes a first current source and a second current source,
   with the closed loop circuit formed, the first current source determines an output current value of the current driver based on information outputted from the arithmetic/control section,
   with the open loop circuit formed, the second current source determines the output current value of the current driver based on information outputted from the arithmetic/control section, and
   prior to recording of information by the record/playback device, the arithmetic/control section sequentially conducts a first test light-emission in which the arithmetic/control section causes the light source to emit light with the closed loop circuit being formed, and a second test light-emission in which the arithmetic/control section causes the light source to emit light with the open loop circuit being formed, and the arithmetic/control section compares a first sampling value obtained by sampling the output of the monitoring section in a period during the first test light-emission to a second sampling value obtained by sampling the output of the monitoring section in a period during the second test light-emission, and adjusts an output current value of the second current source such that a difference between the first sampling value and the second sampling value is equal to or smaller than a predetermined value, to thereby determine light emission intensity for the recording of information.

2. The optical information record/playback device according to claim 1, wherein an initial value $S_{init}$ of step number provided to the second current source during the second test light-emission conducted with the open loop circuit being formed is determined from the following formula:

$$S_{init}=(Pt/(\eta LD \times \eta OPT)+l_{th})/l_{max} \times n$$

wherein,
Pt: power of light beam irradiated onto the recording medium when recording information
$\eta LD$: light emission efficiency of the light source
$\eta OPT$: light utilization efficiency of the optical system
$l_{max}$: maximum current value configurable by the second current source
$l_{th}$: threshold current of the light source
n: configured step number of the second current source.

3. The optical information record/playback device according to claim 1, wherein when switching an operation with the closed loop circuit being formed to an operation with the open loop circuit being formed, the output current of the current driver configured by the first current source is retained for the operation with the open loop circuit being formed.

4. The optical information record/playback device according to claim 3, wherein an initial value $S_{init}$ of step number provided to the second current source during the second test light-emission conducted with the open loop circuit being formed is determined from the following formula:

$$S_{init}=(Pt-P1)/(\eta LD \times \eta OPT \times l_{max}) \times n$$

wherein
Pt: power of light beam irradiated onto the recording medium when recording information
P1: power of light beam irradiated onto the recording medium when playing back information
$\eta LD$: light emission efficiency of the light source
$\eta OPT$: light utilization efficiency of the optical system
$l_{max}$: maximum current value configurable by the second current source
$l_{th}$: threshold current of the light source
n: configured step number of the second current source.

5. The optical information record/playback device according to claim 1, further comprising a storage section for pre-storing at least one point information representing a relationship between an output value of the first current source and the power of the light beam irradiated onto the recording medium.

6. The optical information record/playback device according to claim 1, further comprising a storage section for pre-storing two or more point information representing a relationship between an output value of the first current source and the power of the light beam irradiated onto the recording medium.

7. The optical information record/playback device according to claim 1, wherein a test light-emission time Pw1 for the first test light-emission and a test light-emission time Pw2 for the second test light-emission satisfy the following condition:

$$Pw1 \geq Pw2.$$

8. The optical information record/playback device according to claim 7, wherein the test light-emission time Pw1 and Pw2, and a light emission time Pw3 for recording information on the recording medium satisfy the following condition:

$$Pw1 \geq Pw2 > Pw3.$$

9. The optical information record/playback device according to claim 1, wherein a rotational speed of the recording medium during the first and second test light-emissions is higher than a rotational speed of the recording medium when information is recorded thereon.

10. The optical information record/playback device according to claim 1, wherein focal control of the light beam irradiated on the recording medium is not conducted during the first and second test light-emissions.

11. The optical information record/playback device according to claim 1, wherein the monitoring section includes a gain-switching section for switching an output gain.

12. The optical information record/playback device according to claim 1, wherein the monitoring section includes a photodiode disposed in a housing identical to that for the light source.

13. The optical information record/playback device according to claim 1, wherein:
- the current driver includes a first current driver disposed in the closed loop circuit, a second current driver disposed in the open loop circuit, and an addition section for adding an output of the first current driver and an output of the second current driver based on a control by the arithmetic/control section;
- during playback of information from the recording medium and during the first test light-emission, the arithmetic/control section causes the light source to emit light by using the first current driver; and
- during recording of information onto the recording medium and during the second test light-emission, the arithmetic/control section causes the light source to emit light by using both the first current driver and the second current driver.

* * * * *